United States Patent
Wilton

(10) Patent No.: US 10,293,674 B1
(45) Date of Patent: May 21, 2019

(54) ENGINE DISCONNECT CLUTCHES HAVING TORQUE CONVERTER FEED-THROUGH ACTIVATION FOR VEHICLE POWERTRAINS

(71) Applicant: GM Global Technology Operations LLC, Detroit, MI (US)

(72) Inventor: Daryl A. Wilton, Macomb, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 16/196,421

(22) Filed: Nov. 20, 2018

(51) Int. Cl.
| B60K 6/48 | (2007.10) |
| B60K 6/36 | (2007.10) |
| B60K 6/387 | (2007.10) |
| F16D 13/52 | (2006.01) |
| F16D 25/0638 | (2006.01) |
| F16H 41/04 | (2006.01) |

(52) U.S. Cl.
CPC ............ *B60K 6/48* (2013.01); *B60K 6/36* (2013.01); *B60K 6/387* (2013.01); *F16D 13/52* (2013.01); *F16D 25/0638* (2013.01); *F16H 41/04* (2013.01); *B60K 2006/4825* (2013.01); *B60Y 2200/92* (2013.01); *B60Y 2400/424* (2013.01); *B60Y 2400/426* (2013.01); *B60Y 2400/70* (2013.01)

(58) Field of Classification Search
CPC ....................................................... B60K 6/48
See application file for complete search history.

(56) References Cited

U.S. PATENT DOCUMENTS

| 4,860,861 A | 8/1989 | Gooch et al. | |
| 5,947,243 A | 9/1999 | MacDonald | |
| 6,857,985 B2 * | 2/2005 | Williams | B60K 6/38 |
| | | | 180/65.25 |
| 7,198,587 B2 * | 4/2007 | Samie | F16H 3/666 |
| | | | 192/43.1 |
| 7,681,675 B2 | 3/2010 | Samie et al. | |
| 7,862,437 B2 | 1/2011 | Clark et al. | |
| 7,878,935 B2 | 2/2011 | Lahr | |

(Continued)

FOREIGN PATENT DOCUMENTS

JP 6354203 B2 9/2015

*Primary Examiner* — James A Shriver, II
*Assistant Examiner* — James J Triggs
(74) *Attorney, Agent, or Firm* — Quinn IP Law

(57) ABSTRACT

Presented are engine disconnect clutches, methods for making/using such clutch devices, and vehicles with an engine that is coupled to/decoupled from a transmission and motor via a disconnect clutch. A vehicle includes a transmission with an input shaft connected with a transmission gearing arrangement, and an output shaft connecting the gearing arrangement with the vehicle's wheels. A torque converter pump housing drivingly connects to the vehicle's traction motor. A turbine is mounted inside the pump housing in fluid communication with an impeller. A turbine shaft connects the turbine to the transmission's input shaft. A clutch hub of a disconnect clutch drivingly connects to the vehicle's engine and selectively attaches to the pump housing. The disconnect clutch selectively connects the engine to the motor and transmission by drawing oil from the transmission's oil sump, through a turbine shaft channel and a pump housing port, and into a clutch hub cavity.

20 Claims, 2 Drawing Sheets

(56) References Cited

U.S. PATENT DOCUMENTS

| | | | |
|---|---|---|---|
| 7,931,561 B2 | 4/2011 | Otanez et al. | |
| 7,980,992 B2 | 7/2011 | Sturgin | |
| 8,011,464 B2 | 9/2011 | Samie et al. | |
| 8,042,670 B2 | 10/2011 | Bartos et al. | |
| 8,425,364 B2 | 4/2013 | Lahr | |
| 8,453,772 B2 * | 6/2013 | Brown | B60W 20/10 180/65.285 |
| 8,499,912 B2 | 8/2013 | Samie et al. | |
| 8,961,366 B2 * | 2/2015 | Furuya | B60W 20/10 477/180 |
| 9,415,772 B2 * | 8/2016 | Munsell | B60W 20/40 |
| 9,587,559 B2 * | 3/2017 | Hemphill | B60K 6/38 |
| 2005/0126878 A1 | 6/2005 | Samie | |
| 2009/0098976 A1 * | 4/2009 | Usoro | B60K 6/24 477/5 |
| 2018/0163793 A1 | 6/2018 | Jeong et al. | |

* cited by examiner

ENGINE DISCONNECT CLUTCHES HAVING TORQUE CONVERTER FEED-THROUGH ACTIVATION FOR VEHICLE POWERTRAINS

INTRODUCTION

The present disclosure relates generally to motor vehicle powertrains. More specifically, aspects of this disclosure relate to engine-disconnect clutch devices and attendant control logic for hybrid electric powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through a manually or automatically shifted multi-speed transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full electric vehicles, on the other hand, utilize alternative power sources to propel the vehicle and, thus, minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel system, and exhaust system of an ICE-based vehicle are replaced with an electric motor, a tractive battery back, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. A hybrid electric vehicle (HEV), for example, is generally equipped with an ICE assembly and an electric machine (E-machine), often in the form of a motor/generator unit (MGU), that operate individually or cooperatively to generate tractive power. Since hybrid vehicles are able to derive their power from sources other than the engine, engines in HEVs may be turned off, in whole or in part, while the vehicle is propelled by the electric motor(s).

There are three basic hybrid vehicle powertrain architectures: parallel hybrid, series hybrid, and series-parallel ("power-split") hybrid configurations. Series hybrid architectures, for example, derive all tractive power from electric motors and, thus, eliminate any driving mechanical connection between the engine and final drive members. In this case, the engine functions solely as a regenerative energy source, driving an electric generator that charges the vehicle's onboard traction battery pack. In parallel hybrid architectures, the engine and motor/generator assemblies each has a driving mechanical coupling to the power transmission and, thus, the vehicle's road wheels. As the name implies, series-parallel hybrid architectures combine features from both parallel hybrid and series hybrid powertrains. With gas-only and electric-only operating modes, the motor and engine work independently or jointly—in parallel or in series—depending on the desired vehicle speed, overall vehicle power demand, and state-of-charge (SOC) of the battery.

Vehicle powertrains employing an automatic transmission commonly insert a hydrodynamic torque converter between the internal combustion engine and the multi-speed transmission to govern the transfer of rotational power therebetween. Torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter (TC) acts as a fluid coupling with a fluid impeller that is connected to the engine's output shaft, a turbine that is connected to the transmission's input shaft, and a stator interposed between the impeller and turbine to regulate fluid flow between their respective fluid volumes. A hydraulic pump modulates fluid pressure within the torque converter housing to regulate the transfer of rotational energy from the impeller to the turbine. A large difference in speed between the impeller and turbine results in torque multiplication of the impeller torque, as for example when the vehicle is accelerating from rest with the engine running.

Some torque converters are equipped with a clutch mechanism that is engaged to rigidly connect the engine crankshaft to the transmission input shaft when their speeds are nearly equal, e.g., to avoid unwanted slippage and resultant efficiency losses. System "slip" occurs because the rotational speed of the impeller relative to the turbine in the torque converter is inherently different. A large slip percentage between the engine output and the transmission input affects the fuel economy of the vehicle; employing a torque converter clutch (TCC) helps to reduce the slip between the engine and the transmission. The TCC operates to mechanically lock the impeller at the output of the engine to the turbine at the input of the transmission so that the engine output and transmission input rotate at the same speed. Application of the TCC may be controlled by a powertrain control module (PCM) to modify clutch engaging forces under certain operating conditions, for example, during shifts to eliminate undesired torque fluctuations and engine speed changes during transient periods when torque flow interruption is desired.

One of the many available types of parallel hybrid powertrains is the parallel two-clutch (P2) architecture, which may be typified by a single engine, an automatic power transmission, and a single motor/generator unit that is "side attached" in parallel power-flow communication to the engine and transmission. Mechanically interposed between the engine and motor/generator is a disconnect clutch that, unlike the TCC discussed above, drivingly disengages the engine from both the MGU and transmission such that the MGU can be operated independently to propel the vehicle. P2 architectures help to reduce system costs over counterpart hybrid powertrains by eliminating the use of additional MGUs and reducing the complexity of the transmission. The P2 architecture also helps to eliminate engine friction during regenerative braking operations, and allows the motor/generator to spin at higher speeds while recovering more energy.

SUMMARY

Disclosed herein are engine disconnect clutches for vehicle drivetrains, hybrid powertrain architectures using such clutch devices, methods for making and methods for operating such clutch devices, and motor vehicles equipped with an internal combustion engine (ICE) that is operatively coupled to/decoupled from a multi-speed transmission and an electric traction motor via an intermediate disconnect clutch device. By way of example, and not limitation, there are presented P2 parallel hybrid powertrains with a "K0" engine disconnect clutch with torque converter (TC) feedthrough activation and deactivation. This K0 clutch selectively connects and disconnects the ICE assembly to/from an automatic multi-speed power transmission and an electric motor/generator unit (MGU). Unlike their conventional TCC counterparts, the K0 clutch is located outside of the transmission case, e.g., protruding from the bell housing, packaged between the engine and the transmission. While the control body of the K0 clutch is located outside of the transmission, K0 clutch activation is governed via a hydraulic control system located inside the transmission case. The hydraulic control system draws transmission oil from the transmission sump, routes the oil through interconnected channels in the valve body, transmission case, and stator shaft, into the turbine shaft, then passing the oil through the pump cover of the torque converter, and guides the oil out of the transmission and into the clutch body to activate the K0 clutch. K0 clutch deactivation is achieved by exhausting the transmission oil through these same route segments.

Attendant benefits for at least some of the disclosed engine disconnect clutch configurations include a powertrain architecture that eliminates an auxiliary control body and a separate oil supply dedicated to governing operation of the K0 clutch. In addition to eliminating the dedicated control body and oil supply, disclosed systems, methods and devices also eliminate any associated fluid routing and dedicated packaging space. In so doing, the drivetrain system eliminates potential valve and solenoid leakages as well as attendant warranty issues associated with repairing such leaks. By controlling the K0 clutch using the existing transmission oil pump and oil supply, disclosed powertrain architectures help to minimize powertrain system complexity and costs while reducing gross vehicle weight and concomitantly providing a more efficient subsystem with less complicated routing and exhausting of control oils.

Aspects of this disclosure are directed to hybrid electric powertrains equipped with engine disconnect clutch devices with torque converter feedthrough activation and deactivation capabilities. Presented herein, for example, is a vehicle drivetrain for a motor vehicle with multiple road wheels, an engine, and an electric motor. The engine and electric motor are operable—independently and/or cooperatively—to drive one or more of the road wheels to thereby propel the motor vehicle. The drivetrain includes a transmission, a torque converter interposed between the engine and the transmission, and an engine disconnect clutch for selectively connecting and disconnecting the engine to/from the transmission and motor. The transmission includes a transmission housing, an oil sump connected to the transmission housing, and a gearing arrangement disposed inside the transmission housing. A transmission input shaft drivingly connects the gearing arrangement with the torque converter, and a transmission output shaft drivingly connects the transmission gearing arrangement with at least one of the vehicle's road wheels.

Continuing with the above example, the torque converter includes a pump housing that drivingly connects to the motor and includes a pump cover that defines therethrough a (first) fluid port. An impeller is attached to a pump shell of the pump housing, and a turbine is mounted inside the pump housing in serial power-flow fluid communication with the impeller. A turbine shaft with an internal (first) fluid channel drivingly connects the turbine to the transmission's input shaft. The engine disconnect clutch includes a clutch hub that drivingly connects to the engine, e.g., via a torsional damper and flex plate. A clutch flange projects from the clutch hub and selectively attaches to the pump housing. The clutch hub includes a fill cavity that is fluidly connected to the turbine shaft channel via the fluid port in the pump housing. The engine disconnect clutch is selectively activated (or deactivated) to connect (or disconnect) the engine to (from) the motor and transmission by drawing oil from the transmission oil sump, through the turbine shaft channel and pump cover port, and into the cavity of the clutch hub.

Other aspects of the disclosure are directed to electric-drive motor vehicles equipped with engine disconnect clutch devices with torque converter feedthrough activation and deactivation capabilities. As used herein, the term "motor vehicle" may include any relevant vehicle platform, such as passenger vehicles (REV, BEV, PHEV, etc.), commercial vehicles, industrial vehicles, tracked vehicles, off-road and all-terrain vehicles (ATV), motorcycles, farm equipment, boats, planes, etc. In an example, a motor vehicle includes a vehicle body with multiple road wheels operatively attached to the vehicle body. An internal combustion engine, which is mounted inside an engine compartment of the vehicle body, includes a crankshaft that outputs torque generated by the ICE assembly. An electric traction motor, which is also mounted onto the vehicle body, includes a motor support hub that outputs torque generated by the motor. The motor vehicle is also equipped with a multi-speed power transmission that is attached to the vehicle body and includes a transmission housing with an oil sump storing therein transmission oil. An epicyclic gearing arrangement is stored inside the transmission housing and connected to a transmission input shaft. A transmission output shaft drivingly connects the transmission's gearing arrangement with one or more of the vehicle's road wheels.

The motor vehicle in the above example also includes a hydrodynamic torque converter and an engine disconnect clutch, both of which are interposed between the ICE assembly and transmission. The torque converter includes a pump housing that is attached to the transmission housing and drivingly connected to the motor's motor support hub. An impeller is attached to a pump shell portion of the pump housing, and a turbine is mounted inside a pump cover of the pump housing in fluid communication with the impeller. A turbine shaft drivingly connects the turbine to the transmission input shaft, while a stator shaft attaches the stator and pump shell to the transmission housing. The pump housing defines therethrough a (first) fluid port, and the turbine shaft defines therein a (first) fluid channel that fluidly connects to the fluid port and the transmission's oil sump. The engine disconnect clutch is fabricated with a clutch hub, which is drivingly connected to the engine, and a clutch flange, which is integrally formed with, fastened on, or otherwise rigidly attached to the clutch hub. The clutch flange is selectively rigidly attachable to the pump housing, e.g., by a clutch pack of interleaved friction and reaction plates. The clutch hub includes an internal cavity that is fluidly connected to the channel in the turbine shaft via the port in the pump housing. The engine disconnect clutch is selectively activated to connect the engine to the motor and transmission by drawing oil from the transmission oil sump, through the turbine shaft channel and pump cover port, and into the cavity of the clutch hub.

Additional aspects of the disclosure are directed to methods for making and methods for using any of the disclosed engine disconnect clutch devices, drivetrains, powertrains, and vehicles. In an example, a method is presented for assembling a drivetrain for a motor vehicle. This representative method includes, in any order and in any combination with any of the above and below disclosed options and features: providing a transmission with an oil sump, a gearing arrangement, a transmission input shaft connected with the gearing arrangement, and a transmission output shaft; drivingly connecting the transmission gearing arrangement with one or more of the vehicle's road wheels via the transmission output shaft; providing a torque converter with a pump housing defining therethrough a first port, an impeller attached to the pump housing, a turbine mounted inside the pump housing in fluid communication with the impeller, and a turbine shaft defining a first channel; drivingly connecting the pump housing to the motor; drivingly connecting the turbine to the transmission input shaft via the turbine shaft; providing an engine disconnect clutch including a clutch hub and a clutch flange attached to the clutch hub and configured to selectively attach to the pump housing, the clutch hub including a cavity; drivingly connecting the clutch hub to the engine; and, fluidly connecting the cavity of the clutch hub to the first channel in the turbine shaft via the first port in the pump housing, wherein the engine disconnect clutch is selectively activated to connect the engine to the motor and transmission by drawing oil from the transmission oil sump, through the first channel and the first port, and into the cavity of the clutch hub.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
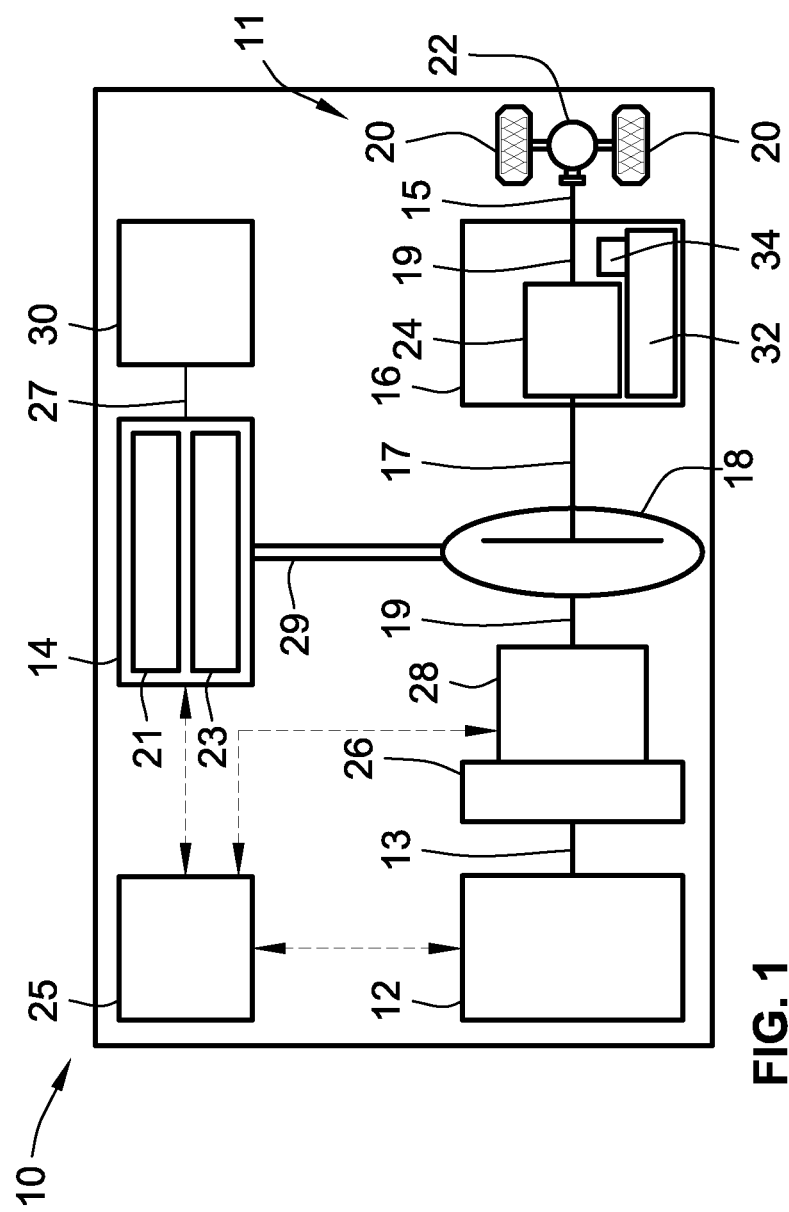
FIG. 1 is a schematic illustration of a representative hybrid electric motor vehicle with a powertrain having an engine assembly drivingly connected to a multi-speed power transmission and a motor/generator unit by an engine disconnect clutch in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel P2 hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure can be practiced. In the same vein, implementation of the present concepts into a P2 hybrid powertrain architecture should also be appreciated as an exemplary application of the novel concepts disclosed herein. As such, it will be understood that aspects and features of the present disclosure can be applied to other vehicle powertrain configurations and utilized for any logically relevant type of motor vehicle. Lastly, only select components of the vehicle have been shown and will be described in additional detail herein. Nevertheless, the vehicles and powertrains discussed below can include numerous additional and alternative features, and other well-known peripheral components, e.g., for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16. The engine 12 transfers power, preferably by way of torque via an engine crankshaft 13 (or "engine output member"), to an input side of the transmission 16. According to the illustrated example, the ICE assembly 12 rotates an engine-driven (first) torsional damper assembly 26 and, through the torsional damper assembly 26, an engine disconnect clutch 28, as will be described in further detail hereinbelow. This engine disconnect clutch 28, when operatively engaged, transmits torque received from the ICE assembly 12 by way of the damper 26 to input structure of the TC 18. The transmission 16, in turn, is adapted to receive, selectively manipulate, and distribute tractive power from the engine 12 to the vehicle's final drive system 11—represented herein by a driveshaft 15, rear differential 22, and a pair of rear road wheels 20—and thereby propel the hybrid vehicle 10. The power transmission 16, hydrokinetic torque converter 18, and disconnect clutch 28 of FIG. 1 share a common transmission oil pan or "sump" 32 for supply of transmission fluid, as well as a shared transmission pump 34 for sufficient hydraulic pressure to activate the elements of the transmission 16, TC 18, and clutch 28.

The ICE assembly 12 operates to propel the vehicle 10 independently of the motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a two or four-stroke compression-ignited diesel engine or a four-stroke spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc.

FIG. 1 also depicts an electric motor/generator unit 14 or other suitable traction motor that operatively connects via a motor support hub 29 (or "motor output member") and torque converter 18 to an input shaft 17 (or "transmission input member") of the electro-hydraulic transmission 16. The motor/generator unit 14 can be directly coupled onto a TC input shaft or rigidly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30, e.g., via regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for an REV, PHEV, range-extended hybrid vehicle, fuel-cell hybrid vehicle, etc.

Power transmission 16 can use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and clutch 28. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event during operation of the vehicle 10.

Figure 2:
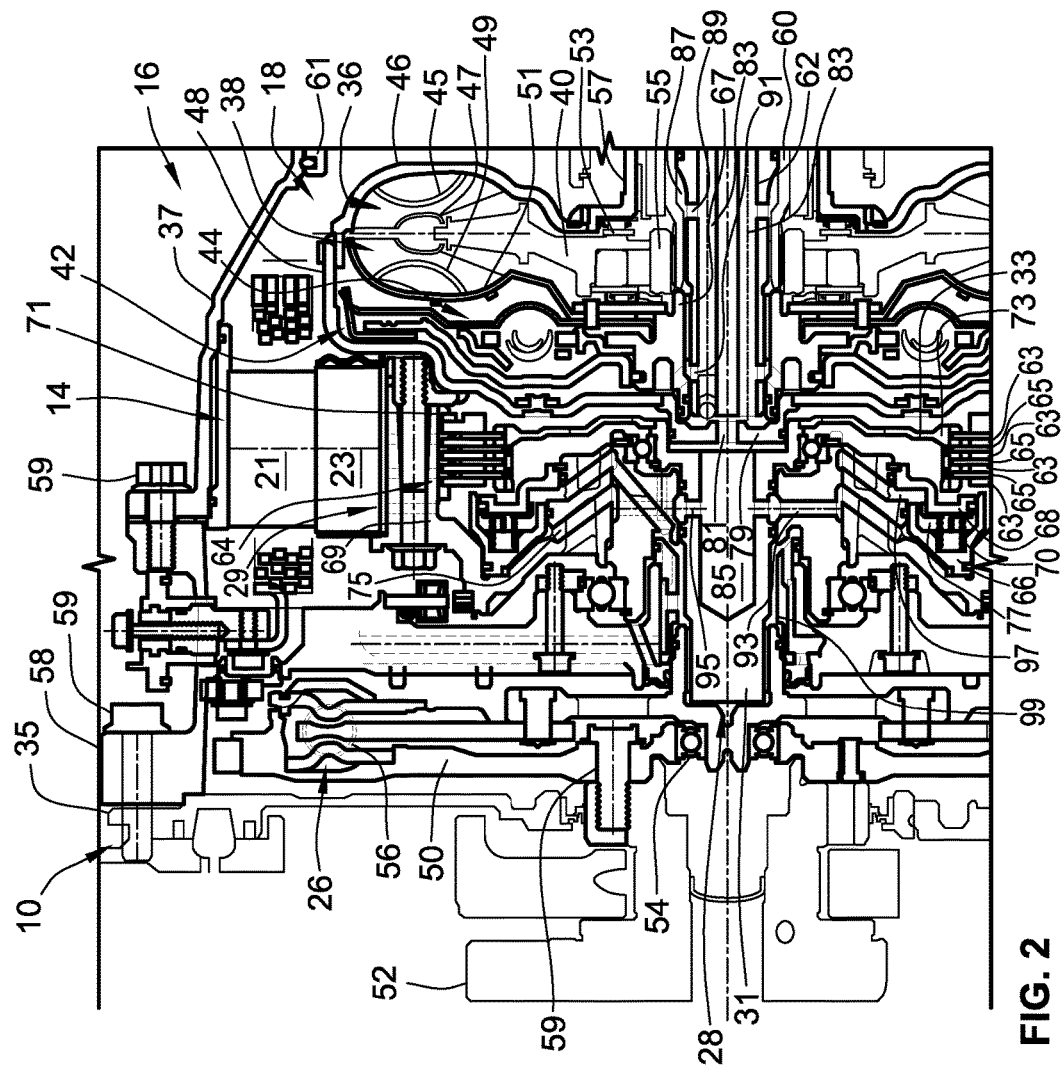
FIG. 2 is a cross-sectional side-view illustration of select portions of a representative transmission, hydrodynamic torque converter, engine-disconnect clutch, and torsional damper assembly in accordance with aspects of the present disclosure.

FIG. 2 is a cross-sectional side-view illustration of select portions of the representative P2 hybrid-electric powertrain presented in FIG. 1. Hydrokinetic torque converter assembly 18 of FIGS. 1 and 2 operates as a fluid coupling for operatively connecting the engine 12 and motor 14 with the internal epicyclic gearing 24 of the power transmission 16. The torque converter assembly 18 includes a bladed TC impeller 36, a bladed TC turbine 38, a stator 40, a TC lockup clutch 42, and a lockup (second) torsional damper assembly 44. To protect these components, the torque converter assembly 18 is constructed with a TC pump housing, defined principally by a transmission-side annular pump shell 46 fixedly attached, e.g., via electron beam welding, MIG or MAG welding, laser welding, and the like, to an engine-side annular pump cover 48 such that a working hydraulic fluid chamber is formed therebetween.

The impeller 36, also referred to in the art as "pump," is situated in serial power-flow fluid communication with the turbine 38. Interposed between the impeller 36 and turbine 38 is a stator 40 that selectively alters fluid flow returning from the turbine 38 to the impeller 36 such that returning fluid aids, rather than impedes, rotation of the impeller 36. The transfer of engine torque from the crankshaft 13 to the turbine 38—via the TC pump cover 48, shell 46 and impeller 36—is through stirring excitation of hydraulic fluid, such as transmission oil, in the TC's internal fluid chamber. More specifically, rotation of the impeller's blades 45, retained between the pump shell 46 and an inner shroud 47, causes hydraulic fluid to be directed toroidally outward toward the turbine 38. When this occurs with sufficient force to overcome the inertial resistance to rotation, the turbine's blades 49, which are coaxially oriented with the impeller blades 45 and retained between the inner shroud 47 and a turbine shell 51, begin to rotate with the impeller 36. The fluid flow exiting the turbine 38 is directed back into the impeller 36 by way of the stator 40. The stator 40, located between a flow exit section of the turbine 38 and a flow entrance section of the impeller 36, redirects the fluid flow from the turbine 38 to the impeller 36 in the same direction as impeller rotation, thereby causing torque multiplication.

Also disposed within the housing of the torque converter assembly 18 is a pair of axial thrust bearings 53 that rotatably support the stator 40 between the pump shell 46 and turbine shell 51. The stator 40 is connected to a stator shaft 60 by way of a freewheel-type roller clutch 55 that is operable to prevent rotation of the stator 40 at low torque converter speeds. At higher torque converter speeds, the direction of hydraulic fluid leaving the turbine 38 changes, causing the stator 40 to over-run the roller clutch 55 and rotate freely on the tubular stator shaft 60. The impeller 36 is secured to a hat-shaped pump hub 57 that receives therethrough and is coaxially aligned with both the stator shaft 60 and a turbine shaft 62. The turbine shell 51 is riveted, welded or otherwise rigidly secured to a turbine hub 67, which is fixedly mounted, for example, by a splined interface onto the turbine shaft 62. Acting as the TC assembly's torque transmitting output member, the turbine shaft 62 passes from the transmission's bell housing 37, through a fluid-sealing dividing wall (not visible in the view provided), and into the transmission's wet housing 61 to fixedly engage the transmission input shaft 17 and thereby transmit torque from the TC 18 to the epicyclic gearing 24 stored inside the wet housing 61.

A dual-mass flywheel 50 drivingly connects the engine's crankshaft 13 (FIG. 1), by way of bolted mounting onto engine hub 52, to the torsional damper assembly 26. To counter torsional and resonance vibrations transmitted across the crankshaft 13, the torsional damper assembly 26 rotatably seats thereon the dual-mass flywheel 50 via radial roller bearing 54 and dampens excitation torque via circumferentially elongated helical compression springs 56 or other suitable biasing members. Torsional damper assembly 26, in turn, passes through a central through-hole in bulkhead plate 58 and rigidly attaches, e.g., via splined engagement, to a clutch hub 31 for common rotation with the engine disconnect clutch 28. Packaged between the engine 12 and transmission 16, this bulkhead plate 58 rigidly attaches, on one side thereof, to the engine's cylinder case 35 and, on an opposing side thereof, to the transmission's bell housing 37 (e.g., via bolts 59). Motor support hub 29 is rotatably mounted on the clutch hub 31 and rigidly attached, e.g., via bolts 59, to the TC pump cover 48 such that rotational power is transferable therebetween. And, as described above, the torque converter 18 operates as a fluid coupling for drivingly connecting the engine 12 and motor 14 to the transmission 16. TC lockup clutch 42 is selectively actuable to directly connect or "lock" the impeller 36 to the turbine 38 such that the engine crankshaft 13, motor support hub 29, and transmission input shaft 17 may rotate at the same speed. Lockup torsional damper assembly 44 generally functions to isolate the transmission 16 from unwanted torsionals generated by the engine 12 and motor 14 during operation and, if desired, to selectively aide the motor 14 in canceling engine compression pulses during startup and shutdown operations.

With continuing reference to FIG. 2, the illustrated drivetrain layout allows the engine to be selectively drivingly connected to and, when desired, selectively disconnected from both the motor 14 and the transmission 16. As shown, the engine disconnect clutch 28—also referred to herein as a "K0 clutch"—is operable to transition back-and-forth between activated and deactivated states to lock and unlock the clutch 28 to/from the motor support hub 29 and, thus, the TC pump cover 48. Clutch 28 is fabricated with a disk-shaped clutch flange 33 that projects radially outward from and is integrally formed with, welded on, or otherwise rigidly attached to the clutch hub 31. A clutch pack 64 is compressible to frictionally lock the clutch flange 33 to the motor support hub 29, providing a driving mechanical connection between the engine 12 and both the motor 14 and torque converter 18. The clutch pack 64 is composed of a series of mutually parallel, disk-shaped reaction plates 63 interleaved with a series of mutually parallel, disk-shaped friction plates 65. According to the illustrated configuration, the reaction plates 63 are rigidly mounted to a toroidal landing portion 69 of the motor support hub 29, e.g., via snap ring 71; friction plates 65, on the other hand, are rigidly seated inside mating slots in a toroidal landing portion 73 of the clutch flange 33. Alternative configurations may optionally mount the friction plates 65 to the motor support hub 29 and the reaction plates 63 to the clutch flange 33.

Compression of the clutch pack 64 to lock the engine disconnect clutch 28 to the motor support hub 29 and pump cover 48 for common rotation therewith is effectuated through a hydraulically actuated piston 66. For instance, motor support hub 29 is fabricated with an internal piston chamber 75 within which the piston 66 translates back-and-forth along a generally rectilinear path (left-to-right and right-to-left in FIG. 2) between deactivated and activated positions. A piston dam 68 is packaged between the piston 66 and the landing portion 73 of the clutch flange 33, rigidly seated on the motor support hub 29. This piston dam 68 is situated in the path of the piston 66, limiting a total travel distance of the piston 66. In so doing, the piston dam 68 prevents the piston 66 from contacting the clutch flange 33. A helical compression-type return spring 70, which is sandwiched between the piston 66 and dam 68, operates to bias the piston 66 away from the piston dam 68 towards the piston's deactivated position. An outer-diameter peripheral surface of the piston dam 68 continuously abuts an inner-diameter surface of the piston 66 while an inner-diameter surface of the piston dam 68 contemporaneously abuts the motor support hub 29; this abutting engagement defines a dam chamber 77 between and the piston 66 and piston dam 68. Chamber 77 fills with oil when motor support hub 29 is rotating; in this manner, an equal amount of centrifugally pressurized oil is placed on both sides of the piston 66 to help ensure that centrifugal forces acting on any remaining oil on the apply-side of the piston will not inadvertently engage the piston 66 and apply the disconnect clutch 28.

The drivetrain architecture illustrated in FIG. 2 employs TC-feedthrough of transmission oil to controllably activate and deactivate the K0 clutch 28. In particular, the TC pump housing of torque converter 18 includes a cylindrical front cap 79 that is rigidly attached to the annular pump cover 48. As shown, the front cap 79 inserts into the K0 clutch 28 to seat thereon and fluidly seal to the clutch hub 31. While shown as discrete components that are rigidly attached together, the pump cover 48 and front cap 79 may be integrally formed as a unitary, single-piece structure. A central (first) fluid port 81 extends through the TC pump housing's front cap 79, fluidly connecting an internal fill cavity 85 inside the clutch hub 31 of K0 clutch 28 to a pair of elongated (first) channels 83 extending longitudinally inside the turbine shaft 62. The stator shaft 60 has an internal bore 87 that receives therethrough the turbine shaft 62; the turbine shaft 62 is provided with a (third) fluid port 89 that fluidly connects each fluid channel 83 with the internal bore 87. Another (fourth) fluid port 91 fluidly connects the turbine shaft's internal channels 83 with a TC fill chamber for selectively actuating the TC lockup clutch 42. The motor support hub 29 includes one or more (first) fluid conduits 93 that fluidly connect the piston chamber 75 to the cavity 85 inside of the clutch hub 31 via a (second) fluid port 95 defined through the cylindrical wall of the clutch hub 31.

Continuing with the above-discussion of K0 clutch TC-feedthrough activation, the engine disconnect clutch 28 of FIG. 2 is selectively activated by the ECU 25 (or other similarly suitable vehicle controller device, control module, or logic circuit) transmitting a command signal to the transmission pump 34 to pressurize and feed oil from the transmission sump 32 towards the components stored in the transmission's bell housing 37. Transmission oil is drawn from the sump 32 and out of the wet housing 61 through the internal bore 87 in the stator shaft 60. This oil passes from the stator shaft's internal bore 87, through the fluid port 89 extending through the cylindrical wall of the turbine shaft 62, and into the longitudinally elongated channels 83. Oil exits openings in a distal end of the turbine shaft 62, passes through the pump cover 48 via the fluid port 81 in the TC pump housing's front cap 79, and into the fill cavity 85 inside the clutch hub 31. Pressurized transmission oil exits from the fill cavity 85, through the clutch hub fluid port 95 and support hub conduits 93, and enters into the piston chamber 75. Once this chamber 75 fills, the piston 66 is pushed towards the clutch flange 33 to the piston's activated position (rightward in FIG. 2). The piston 66 will then engage and press against the clutch pack 64, causing the reaction plates 63 and the friction plates 65 to frictionally engage with one another. When the K0 clutch 28 is fully engaged (i.e., when there is no slip between the reaction and friction plates 63, 65) the clutch flange 33 is frictionally coupled to the landing portion 69 of the motor support hub 29 such that the two components rotate in unison.

Engine disconnect clutch 28 of FIG. 2 is selectively deactivated, at least in part, by exhausting transmission oil back through the same fluid path in which it was originally introduced (e.g., the fluid movements discussed in the preceding paragraph are carried out in reverse order). As oil is evacuated from the piston chamber 75, return spring 70 biases the piston 66 away from the piston dam 68 towards the piston's deactivated position (leftward in FIG. 2). In addition, transmission oil may be drawn from the oil sump 32, through a secondary passage 99 and one or more (second) fluid conduits 97 in the motor support hub 29, and into the dam chamber 77. The engine disconnect clutch 28 is selectively deactivated to disconnect the engine 12 from the motor 14, TC 18 and transmission 16 by transmitting oil into the dam chamber 77. Filling the dam chamber 77 will generate sufficient hydraulic pressure to push the piston 66 away from the clutch flange 33 and thereby disengage the piston 66 from the clutch pack 64.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A drivetrain for a motor vehicle, the motor vehicle including multiple road wheels, an engine, and an electric motor, the engine and electric motor each being operable to drive at least one of the road wheels to thereby propel the motor vehicle, the drivetrain comprising:
 a transmission including an oil sump, a gearing arrangement, a transmission input shaft connected with the gearing arrangement, and a transmission output shaft configured to drivingly connect the gearing arrangement with the at least one of the road wheels;
 a torque converter including a pump housing defining therethrough a first port and configured to drivingly connect to the motor, an impeller attached to the pump housing, a turbine mounted inside the pump housing in fluid communication with the impeller, and a turbine shaft defining a first channel and drivingly connecting the turbine to the transmission input shaft; and
 an engine disconnect clutch including a clutch hub and a clutch flange projecting from the clutch hub, the clutch hub being configured to drivingly connect to the engine, the clutch flange being configured to selectively attach to the pump housing, the clutch hub including a cavity fluidly connected to the first channel in the turbine shaft via the first port in the pump housing, the engine disconnect clutch being selectively activated, to thereby connect the engine to the motor and transmission, by receiving oil from the transmission oil sump, through the first channel and the first port, and into the cavity of the clutch hub.

2. The drivetrain of claim 1, further comprising a motor support hub configured to seat thereon the motor, the motor support hub including a piston chamber, a piston disposed in the piston chamber, and a first conduit fluidly connecting the piston chamber to the cavity of the clutch hub, wherein selectively activating the engine disconnect clutch further includes transmitting oil from the cavity, through the first conduit, into the piston chamber to thereby transition the piston towards the clutch flange to an activated position.

3. The drivetrain of claim 2, wherein the engine disconnect clutch includes a second port defined through a cylindrical wall of the clutch hub and fluidly connecting the cavity of the clutch hub to the first conduit of the motor support hub.

4. The drivetrain of claim 2, wherein the motor support hub is rotatably mounted on the clutch hub and rigidly attached to the pump housing.

5. The drivetrain of claim 2, further comprising a plurality of friction plates mounted to one of the motor support hub or the clutch flange, and a plurality of reaction plates mounted to the other of the motor support hub or the clutch flange, wherein filling the piston chamber causes the piston to press against and frictionally engage the friction plates and the reaction plates.

6. The drivetrain of claim 2, wherein the motor support hub further includes a piston dam configured to abut and thereby limit a travel distance of the piston.

7. The drivetrain of claim 6, wherein the motor support hub defines a dam chamber between the piston dam and the piston, and a second conduit fluidly connecting the dam chamber to a secondary passage fluidly connected to the oil sump, wherein the engine disconnect clutch is selectively deactivated to disconnect the engine from the motor and transmission by transmitting oil from the oil sump, through the second conduit, and to the dam chamber to thereby transition the piston away from the clutch flange to a deactivated position.

8. The drivetrain of claim 6, wherein the motor support hub further includes a return spring biasing the piston away from the piston dam towards a deactivated position.

9. The drivetrain of claim 1, wherein the torque converter further includes a tubular stator shaft with an internal bore receiving therethrough the turbine shaft, the turbine shaft including a third port fluidly connecting the first channel with the internal bore, wherein selectively activating the engine disconnect clutch further includes drawing oil from the oil sump, through the internal bore of the tubular stator shaft, and into the first channel of the turbine shaft.

10. The drivetrain of claim 9, wherein the torque converter further includes a stator mounted on the tubular stator shaft and interposed between the impeller and the turbine, and wherein the turbine is mounted on the turbine shaft.

11. The drivetrain of claim 1, wherein the pump housing includes an engine-facing pump cover configured to drivingly connect to the motor, a transmission-facing pump shell rigidly attached to the pump cover and the impeller, and a front cap rigidly attached to the pump cover, the front cap seating thereon the clutch hub and defining therethrough the first port.

12. The drivetrain of claim 1, further comprising a first rotational damper assembly mounted on the clutch hub of the engine disconnect clutch, the first rotational damper assembly being configured to rotatably mount thereon a flex plate of the engine.

13. The drivetrain of claim 1, further comprising a second rotational damper assembly mounted on the turbine shaft inside the pump housing of the torque converter, the second rotational damper assembly being rigidly mounted to the turbine.

14. The drivetrain of claim 1, wherein the transmission includes a wet housing and a bell housing attached to one end of the wet housing to define therein a fluid chamber, the wet housing storing therein the gearing arrangement, and the bell housing storing therein the torque converter, and wherein the engine disconnect clutch is configured to position between the torque converter and the engine.

15. A hybrid electric vehicle comprising:
a vehicle body with a plurality of road wheels attached to the vehicle body;
an internal combustion engine (ICE) assembly attached to the vehicle body, the ICE assembly including a crankshaft configured to output torque generated by the ICE assembly;
a traction motor attached to the vehicle body, the traction motor including a motor support hub configured to output torque generated by the traction motor;
a multi-speed power transmission attached to the vehicle body and including a transmission housing with an oil sump storing therein transmission oil, a gearing arrangement stored inside the transmission housing, a transmission input shaft connected with the gearing arrangement, and a transmission output shaft drivingly connecting the transmission gearing arrangement with at least one of the road wheels;
a hydrodynamic torque converter attached to the transmission housing and including a pump housing drivingly connected to the motor support hub, an impeller attached to the pump housing, a turbine mounted inside the pump housing in fluid communication with the impeller, and a turbine shaft drivingly connecting the turbine to the transmission input shaft, the pump housing defining therethrough a first port, and the turbine shaft defining therein a first channel fluidly connected to the first port and the transmission oil sump; and
an engine disconnect clutch including a clutch hub drivingly connected to the ICE assembly, and a clutch flange rigidly attached to the clutch hub and selectively rigidly attachable to the pump housing, the clutch hub including a cavity fluidly connected to the first channel in the turbine shaft via the first port in the pump housing, the engine disconnect clutch being selectively activated to connect the ICE assembly to the traction motor and the power transmission by drawing oil from the transmission oil sump, through the first channel and the first port, and into the cavity of the clutch hub.

16. A method of assembling a drivetrain for a motor vehicle, the motor vehicle including multiple road wheels, an engine, and an electric motor, the engine and electric motor each being operable to drive at least one of the road wheels to thereby propel the motor vehicle, the method comprising:
providing a transmission with an oil sump, a gearing arrangement, a transmission input shaft connected with the gearing arrangement, and a transmission output shaft;
drivingly connecting the transmission gearing arrangement with the at least one of the road wheels via the transmission output shaft;
providing a torque converter with a pump housing defining therethrough a first port, an impeller attached to the pump housing, a turbine mounted inside the pump housing in fluid communication with the impeller, and a turbine shaft defining a first channel;
drivingly connecting the pump housing to the motor;
drivingly connecting the turbine to the transmission input shaft via the turbine shaft;
providing an engine disconnect clutch including a clutch hub and a clutch flange projecting from the clutch hub and configured to selectively attach to the pump housing, the clutch hub including a cavity;
drivingly connecting the clutch hub to the engine; and
fluidly connecting the cavity of the clutch hub to the first channel in the turbine shaft via the first port in the pump housing,
wherein the engine disconnect clutch is selectively activated to connect the engine to the motor and transmission by drawing oil from the transmission oil sump, through the first channel and the first port, and into the cavity of the clutch hub.

17. The method vehicle of claim 16, further comprising:
providing a motor support hub including a piston chamber, a piston disposed in the piston chamber, and a first conduit fluidly connecting the piston chamber to the cavity of the clutch hub; and
mounting the motor on the motor support hub,
wherein selectively activating the engine disconnect clutch further includes transmitting oil from the cavity, through the first conduit, and into the piston chamber to thereby transition the piston towards the clutch flange to an activated position.

18. The method vehicle of claim 17, wherein the engine disconnect clutch includes a second port defined through a cylindrical wall of the clutch hub and fluidly connecting the cavity of the clutch hub to the first conduit of the motor support hub.

19. The method vehicle of claim 17, wherein the motor support hub defines a dam chamber between a piston dam and the piston, and a second conduit fluidly connecting the dam chamber to a secondary passage fluidly connected to the oil sump, wherein the engine disconnect clutch is selectively deactivated to disconnect the engine from the motor and transmission by transmitting oil from the oil sump, through the second conduit, and to the dam chamber to thereby transition the piston away from the clutch flange to a deactivated position.

20. The method vehicle of claim 16, wherein the torque converter further includes a tubular stator shaft with an internal bore receiving therethrough the turbine shaft, the turbine shaft including a third port fluidly connecting the first channel with the internal bore, wherein selectively activating the engine disconnect clutch further includes drawing oil from the oil sump, through the internal bore of the tubular stator shaft, and into the first channel of the turbine shaft.

* * * * *